United States Patent
Murooka et al.

(10) Patent No.: US 6,677,031 B1
(45) Date of Patent: Jan. 13, 2004

(54) MULTILAYER FILM, REFRACTIVE POLARIZER FILM AND SEMI-TRANSPARENT FILM

(75) Inventors: Hirofumi Murooka, Sagamihara (JP); Hiroshi Tokuda, Iwakuni (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/914,008

(22) PCT Filed: Nov. 21, 2000

(86) PCT No.: PCT/JP00/08208
§ 371 (c)(1), (2), (4) Date: Aug. 22, 2001

(87) PCT Pub. No.: WO01/47711
PCT Pub. Date: Jul. 5, 2001

(30) Foreign Application Priority Data

Dec. 24, 1999 (JP) ............................................ 11-366434

(51) Int. Cl.⁷ ..................... B32B 27/08; B32B 27/20; B32B 27/30; B32B 27/36
(52) U.S. Cl. ................. 428/212; 428/216; 428/339; 428/480; 428/483; 428/323; 428/325; 428/327; 428/328; 428/329; 428/330; 428/331; 428/910; 359/483; 359/487; 359/488; 359/494; 359/500; 359/580; 359/582; 359/584; 359/586; 359/589
(58) Field of Search ................................. 428/212, 216, 428/480, 483, 323, 327, 328, 329, 330, 331, 339, 325, 910; 359/483, 487, 488, 494, 500, 580, 587, 584, 586, 589

(56) References Cited

U.S. PATENT DOCUMENTS

| 3,610,729 A | 10/1971 | Rogers |
| 3,711,176 A | 1/1973 | Alfrey, Jr. et al. |
| 4,310,584 A | 1/1982 | Cooper et al. |
| 4,756,953 A | 7/1988 | Utsumi |
| 4,761,327 A | 8/1988 | Hamano et al. |
| 4,818,581 A * | 4/1989 | Katoh et al. ................. 428/143 |
| 5,122,506 A | 6/1992 | Wang |
| 5,122,905 A | 6/1992 | Wheatley et al. |
| 5,126,880 A | 6/1992 | Wheatley et al. |
| 5,486,949 A | 1/1996 | Schrenk et al. |
| 6,049,419 A * | 4/2000 | Wheatley et al. ........... 359/359 |
| 6,207,260 B1 * | 3/2001 | Wheatley et al. ........... 428/212 |
| 6,451,414 B1 * | 9/2002 | Wheatley et al. ........... 428/212 |

FOREIGN PATENT DOCUMENTS

| JP | A-8-334607 | 12/1996 |
| JP | A-9-506837 | 7/1997 |
| JP | A-9-506984 | 7/1997 |
| WO | WO 99/36262 | 7/1999 |
| WO | WO 01/22130 A1 | 3/2001 |

* cited by examiner

*Primary Examiner*—Vivian Chen
(74) *Attorney, Agent, or Firm*—Sughrue Mion, PLLC

(57) ABSTRACT

There is provided a multilayer film which is useful as a refractive polarizer film or a semi-transparent film. The multilayer film comprises a first layer comprising of a polyester whose main recurring unit is ethylene-2,6-naphthalene dicarboxylate and a second layer comprising mainly of a thermoplastic resin which is different from the polyester of the first layer, wherein at least one of the first and second layers contains 0.001 to 0.5 wt % of inert fine particles having an average particle diameter of 0.01 to 2 μm; the first and second layers each have a thickness of 0.05 to 0.3 μm and are laminated alternately to form a laminate comprising at least 11 layers; the laminate is oriented at least in one direction; and the second layer has a lower refractive index than the first layer at least in one direction. This multilayer film has excellent handling properties such as film formability and windability and an easily adjustable reflectance.

22 Claims, No Drawings

MULTILAYER FILM, REFRACTIVE POLARIZER FILM AND SEMI-TRANSPARENT FILM

TECHNICAL FIELD

The present invention relates to a multilayer film and a refractive polarizer film and semi-transparent film in which the multilayer films are laminated. More specifically, it relates to the multilayer film in which a layer having low refractive index and a layer having high refractive index are laminated alternately and orderly and which selectively reflects light by structural interference between the layers, a refractive polarizer film and semi-transparent film in which the multilayer films are laminated.

BACKGROUND ART

When a multilayer film is prepared by laminating a layer having low refractive index and a layer having high refractive index alternately and repeatedly, it will be obtained an optical interference film which selectively reflects or transmits the light of specific wavelength by the structural optical interference between the layers. When the wavelength of the light which is selectively reflected or transmitted is within the range of visible light, such a multilayer film will be obtained as a film which has an excellent design imparted by structural color development, for example, a film which appears iridescent. Further, since the design obtained above is imparted not by dyes but by the structural color development of the multilayer film, there is no problem of fading. Further, since the multilayer film has high reflectance of light even if it does not use metal, it can also use the multilayer film as a metallic luster film or a reflective mirror. Furthermore, stretching the multilayer film can further control the refractive index of the surface direction between or in the layers. For example, if the refractive index of the surface direction in the layers has anisotropy, the multilayer film can also be used as a reflective polarizer film.

As a multilayer stretched film prepared by stretching such a multilayer film, WO95/17699 discloses a multilayered polymer film in which a crystalline naphthalenedicarboxylic acid polyester and another selected polymer whose refractive index associated with at least one in-plane axis is lower than that of the crystalline naphthalenedicarboxylic acid polyester are laminated alternately, wherein the film of multilayered polymer has a thickness of smaller than 0.5 $\mu$m and the refractive index associated with at least one in-plane axis of the crystalline naphthalenedicarboxylic acid polyester layer is higher than that of the adjacent layer comprising the above selected polymer.

Further, WO95/17303 discloses a reflective polarizer using the film of multilayered polymer which is indicated in the above WO95/17699.

However, since these films of multilayered polymer contain no slip agents in the surface layer in order to optically enhance light transmittance, they are difficult to handle, for example, to wind up. The difficulty in handling such as winding of the films will be not a serious problem when the films are thick. However, when the thin films are formed, they will be extremely difficult to wind and substantially impossible to handle.

Moreover, although the said two publications mention a copolymer and blend of polyethylene terephthalate or polynaphthalene terephthalate as the selected polymer in the description, only the copolymer is indicated in their examples, and it is not indicated at all about the blend therein. In addition, when the present inventors have attempted to use a multilayer laminated film comprising the copolymer which was disclosed in the examples of the aforementioned two publications as a semi-transparent film, it has been found that the multilayer laminated film was significantly inefficient for producing a variety of products since copolymers of different refractive indices had to be prepared to adjust the refractive index of each layer when a semi-transparent film with various reflectances would be produced.

SUMMARY OF THE INVENTION

It is an object of the present invention to provide a multilayer film which is excellent in the handling characteristic such as formability and windability even if it is a thin film by solving the above-mentioned problems.

It is another object of the present invention to provide a multilayer film which can adjust reflectance easily.

It is still another object of the present invention to provide a refractive polarizer film prepared by laminating the multilayer films of the present invention.

It is still another object of the present invention to provide a semi-transparent film prepared by laminating the multilayer films of the present invention.

Other objects and advantages of the present invention will be apparent from the following description.

According to the present invention, firstly, the above objects and advantages of the present invention can be achieved by a multilayer film comprising a first layer comprising mainly of a polyester whose main recurring unit is ethylene-2,6-naphthalene dicarboxylate and a second layer comprising mainly of a thermoplastic resin which is different from the polyester of the first layer, wherein at least one of the first and second layers contains 0.001 to 0.5 wt % of inert fine particles having an average particle diameter of 0.01 to 2 $\mu$m; the first and second layers each have a thickness of 0.05 to 0.3 $\mu$m and are laminated alternately to form a laminate comprising at least 11 layers; the laminate is oriented at least in one direction; and the second layer has a lower refractive index than the first layer at least in one direction.

Further, according to the present invention, secondly, the above objects and advantages of the present invention can be achieved by a refractive polarizer film comprising some laminates of the above multilayer films of the present invention.

Further, according to the present invention, thirdly, the above objects and advantages of the present invention can be achieved by a semi-transparent film comprising the above multilayer films of the present invention.

Still other objects and advantages of the present invention will be apparent from the following description.

DETAILED DESCRIPTION OF THE PREFERRED EMBODIMENTS

The multilayer film of the present invention is a film in which a layer comprising a polymer having a high refractive index (layer A) and a layer comprising a polymer having a lower refractive index than the polymer of the layer A (layer B) are laminated alternately. A description will be given to the multilayer film of the present invention hereinafter.

The layer A in the present invention comprises a polyester whose main recurring unit is ethylene-2,6-naphthalene dicarboxylate.

The polyester may be a polymer in which ethylene-2,6-naphthalate constitutes preferably at least 85 mol %, more preferably at least 98 mol %, of the total of all recurring units.

Particularly preferably as the polyester is an polyethylene-2,6-naphthalene dicarboxylate homopolymer. The use of these polyethylene-2,6-naphthalates has such an advantage that the layer A exhibits a high refractive index after stretched.

As for the copolymer components of the above polyester, examples for the acid components illustrate aromatic carboxylic acids such as terephthalic acid, isophthalic acid and 2,7-naphthalene dicarboxylic acid except 2,6-naphthalene dicarboxylic acid; aliphatic dicarboxylic acids such as adipic acid, azelaic acid, sebacic acid and decanedicarboxylic acid; and alicyclic dicarboxylic acids such as cyclohexane dicarboxylic acid, and examples for the glycol components illustrate aliphatic diols such as butane diol and hexane diol; and alicyclic diols such as cyclohexane dimethanol. The layer B in the present invention must have a lower refractive index than the layer A comprising polyethylene-2,6-naphthalene dicarboxylate at least in one direction. The layer B in the present invention has a refractive index which is preferably at least 0.005, more preferably at least 0.02, lower than the layer A comprising polyethylene-2,6-naphthalene dicarboxylate at least in one direction. Preferable examples of the thermoplastic resin constituting the layer B described above include a mixture of a polyester whose main recurring unit is ethylene-2,6-naphthalenedicarboxylate and a polyester whose main recurring unit is ethylene terephthalate in the weight ratio of 5:95 to 95:5; a syndiotactic polystyrene; and a polyester whose main recurring unit is ethylene terephthalate.

In these, the above mixture and the syndiotactic polystyrene are preferable, and the above mixture is especially still more preferable. As for the above mixture, a desired refractive index can be easily obtained by changing the weight ratio of the two kinds of polyesters.

Firstly, a description will be given to the mixture of a polyester whose main recurring unit is ethylene-2,6-naphthalene dicarboxylate and a polyester whose main recurring unit is ethylene terephthalate in the weight ratio of 5:95 to 95:5.

The weight ratio of the polyesters is preferably 20:80 to 80:20.

When the proportion of the polyester whose main recurring unit comprises ethylene-2,6-naphthalene dicarboxylate is higher than 95% by weight based on the total weight of the two polyesters, the difference in refractive index between the layer A and the layer B will be liable to be insufficient, while when it is lower than 5% by weight, the difference in melt viscosity between the layer A and the layer B will be excessively large, thereby making it extremely difficult to maintain the multilayer structure.

Meanwhile, when the proportion of the polyester whose main recurring unit is ethylene terephthalate is lower than 5% by weight based on the total weight of the two polyesters, the difference in refractive index between the layer A and the layer B will be liable to be insufficient, while when it is higher than 95% by weight, the difference in melt viscosity between the layer A and the layer B will be excessively large, thereby making it extremely difficult to maintain the multilayer structure.

As described above, since the refractive index of the layer B can be easily changed by changing the mixing ratio of the two polyesters within the above range, it is not necessary to prepare a great number of polymers for adjusting the reflectance. In other words, the use of the above mixture has such an advantage that only adjusting the mixing ratio of the mixture can produce multilayer films having a variety of reflectances easily. Further, since the layer B will exhibit low crystallinity when the polymer of the layer B is a copolymer, special equipment such as an extruder and dryer may be needed at the time of extruding the polymer in a molten state. However, it has an advantage of not needing such special equipment since the above-mentioned mixture has a crystalline small fall.

The polyester whose main recurring unit is ethylene-2,6-naphthalene dicarboxylate may be contain a polymer in which ethylene-2,6-naphthalate constitutes preferably at least 80 mol %, more preferably at least 90 mol %, of the total of all recurring units.

Particularly preferable as this polyester is a polyethylene-2,6-naphthalene dicarboxylate homopolymer.

Illustrative examples of the copolymer components of this polyester are the same as those listed for the polyester of the above layer A which contains ethylene-2,6-naphthalene dicarboxylate as a main recurring unit.

The polyester whose main recurring unit is ethylene terephthalate may be contain a polymer in which ethylene terephthalate constitutes preferably at least 80 mol %, more preferably at least 90 mol %, of the total of all recurring units. Particularly preferable as the polyester is a polyethylene terephthalate homopolymer.

As for the copolymer components of the above polyester, examples for the acid components illustrate other aromatic carboxylic acids such as isophthalic acid and 2,7-naphthalene dicarboxylic acid; aliphatic dicarboxylic acids such as adipic acid, azelaic acid, sebacic acid and decanedicarboxylic acid; and alicyclic dicarboxylic acids such as cyclohexane dicarboxylic acid, and examples for the glycol components illustrate aliphatic diols such as butane diol and hexane diol; and alicyclic diols such as cyclohexane dimethanol.

The above mixture has two melting points, and the higher melting point is preferably 220° C. to 265° C., more preferably 240° C. to 260° C. and is preferably at least 10° C., more preferably at least 20° C., lower than the melting point of the polyester of the layer A. When the difference between the melting points is at least 10° C., it will be easy to enlarge the difference in orientation by heat treatment and to distinguish between the refractive indices.

Next, a description will be given to the case where the polymer constituting the layer B in the present invention is syndiotactic polystyrene. Syndiotactic polystyrene is generally a polystyrene having a syndiotactic structure, that is, a three-dimensional structure in which phenyl groups and substituted phenyl groups as side chains are placed at both sides of a principal chain comprising carbon-carbon bonds in a staggered arrangement, and its tacticity is quantified by the nuclear magnetic resonance of isotopic carbon. The tacticity measured by this method can be expressed by the existence ratio of two or more consecutive constitutional units, for example, diad when the number of consecutive constitutional units is two, triad when the number of consecutive constitutional units is three, and pentad when the number of consecutive constitutional units is five. The syndiotactic polystyrene in the present invention has such syndiotacticity that the proportion of racemic diads is preferably at least 75%, more preferably at least 85%, or the proportion of racemic pentads is preferably at least 30%, more preferably at least 50%. The polystyrene of interest may be contain polystyrene, polyalkylstyrene, polystyrene halide, polyalkoxystyrene, polyvinylbenzoic acid, hydrogenated polymers of these, and copolymers of the constitutional units of these. The syndiotactic polystyrene has a melting point in the range preferably 220° C. to 270° C., more preferably 240° C. to 270° C. Further, when the syndiotactic polystyrene is a copolymer, a copolymer of styrene and p-methyl styrene is particularly preferable. The melting point of homosyndiotactic polystyrene is 270° C. The melting point of the copolymer can be controlled by changing the amount of p-methyl styrene to be copolymerized. The more the amount of p-methyl styrene increases, the melting point and crystallinity becomes lower. The amount of p-methyl styrene is preferably 0 to 20 mol %. When the melting point is lower than 220° C., the crystallinity of the syndiotactic polystyrene will be lower excessively, thereby making film formation difficult and lowering heat resistance (changes in dimension when subjected to heat treatment). An atactic polystyrene and an isotactic polystyrene are not preferable because they are difficult to form a film with due to low crystallinity and because they have poor heat resistance due to the fact that they have no crystal structure or have a loose structure.

The polyester whose main recurring unit is ethylene-2,6-naphthalene dicarboxylate shows an increase in the refractive index in the stretch direction when stretched, while the syndiotactic polystyrene hardly shows an increase in the refractive index in the stretch direction since it shows negative optical anisotropy. Therefore, the difference of the refractive indices of both layers can be enlarged considerably in the stretched film.

The difference between the melting points of the polyester whose main recurring unit is ethylene-2,6-naphthalene dicarboxylate (layer A) and the syndiotactic polystyrene (layer B) is preferably 30° C. or less.

The difference of more than 30° C. is not preferable because peeling occurs between the layers at the time of forming an unstretched sheet after the above compounds are molten, laminated and solidified or at the time of stretching the unstretched sheet.

Next, a description will be given to the case where the polymer constituting the layer B in the present invention is polyester whose main recurring unit is ethylene terephthalate.

As this polyester, copolyethylene terephthalate is preferably used. The copolymer components of copolyethylene terephthalate may be dicarboxylic acid components or glycol components. Illustrative examples of the dicarboxylic acid components include aromatic dicarboxylic acids such as isophthalic acid, phthalic acid and naphthalene dicarboxylic acid; aliphatic dicarboxylic acids such as adipic acid, azelaic acid, sebacic acid and decanedicarboxylic acid; and alicyclic dicarboxylic acids such as cyclohexane dicarboxylic acid. Illustrative examples of the glycol components include aliphatic diols such as butane diol and hexane diol; and alicyclic diols such as cyclohexane dimethanol. These copolymer components can be used solely or in combination of two or more. It is particularly preferable to use isophthalic acid as the copolymer acid component. The amount of isophthalic acid to be copolymerized is preferably 4 to 18 mol %, more preferably 8 to 15 mol %. As the copolyethylene terephthalate, poly(ethylene terephthalate-isophthalate) copolymer is particularly preferable.

The copolyethylene terephthalate has a melting point in the range of preferably 210° C. to 245° C. When the melting point of copolyethylene terephthalate is lower than 210° C., the crystallinity of the polymer will become excessively low, thereby making film formation difficult. Further, the heat resistance of the layer B will deteriorate, thereby making adversely affect the heat resistance of the whole film. On the other hand, when the melting point of copolyethylene terephthalate is higher than 245° C., the crystallinity of the polymer will increase, thereby promoting the orientation and crystallization at the stretch temperature which is relatively higher than the glass transition point (Tg) of the polymer. Thus, continuous film formability will deteriorate, and the adhesion of the layer B to the layer A will be liable to lower.

The melting point and Tg of the copolyethylene terephthalate can be controlled by selecting and changing the types and amounts of the copolymer components.

The intrinsic viscosity (orthochlorophenol, 35° C.) of the above copolyethylene terephthalate is preferably 0.45 to 0.8, more preferably 0.5 to 0.7.

The polyester (layer A) whose main recurring unit is ethylene-2,6-naphthalene dicarboxylate and the polyester (layer B) whose main recurring unit is ethylene terephthalate preferably has such a relationship that the melting point of the latter is at least 20° C. lower than the melting point of the former.

In the present invention, the difference between the glass transition points (Tg) of the layers A and B of the multilayer film is preferably at least 40° C. Within this range, the stretch temperature consistent with Tg of the layer A will be an excessively high stretch temperature to the polymer of the layer B, the orientation by stretching will be suppressed, and the polymer of the layer B will be in the state almost near a flow (flow stretching). Therefore, since the orientation of the polymer of the layer B is suppressed while the polymer of the layer A is oriented by stretching and the refractive index thereof increases, the difference between the refractive indices of the layers becomes large. When the difference of Tg of these layers is less than 40° C., the difference between the stretch temperature acceptable for the polymer of the layer A and Tg of the polymer of the layer B will be small, and the difference between the refractive indices of the layers A and B after stretching will be liable to become insufficient. When the layer A or the layer B each have two or more Tgs, "the difference between the Tgs" as used herein means the difference between the highest Tg of the layer A and the lowest Tg of the layer B.

The multilayer film of the present invention contains inert fine particles having an average particle diameter of 0.01 to 2 μm in an amount of 0.001 to 0.5 wt % in at least one layer of the layers A and B. It is preferable that this inert fine particles be contained at least in the layer A. When the average particle diameter of the inert fine particles is smaller than 0.01 μm or the content thereof is lower than 0.001 wt %, the windability of the film will not be able to improve sufficiently. On the other hand, when the average particle diameter of the inert fine particles is larger than 2 μm or the content thereof is higher than 0.5 wt %, the deterioration of the optical properties by the particles will become noticeable, and the light transmittance of the whole film will decrease. Further, since particles of 0.22 to 0.3 μm are liable to scatter the wavelength of visible light, the use of inert fine particles having an average particle diameter of 0.1 to 0.2 μm or the use of inert fine particles having an average particle diameter of 0.1 to 0.2 μm and relatively large inert fine particles having an average particle diameter of 0.32 to 1 μm in combination is particularly preferable. The light transmittance is preferably 70% or higher. When it is lower than 70%, the film underperforms for optical applications. The average particle diameter is preferably 0.05 to 1 μm, more preferably 0.1 to 0.3 μm. Further, the content of the inert fine particle is preferably 0.005 to 0.2 wt %.

Meanwhile, since the average particle diameter of the inert fine particles is 0.01 to 2 μm while the thickness of each of the layer A and B is 0. 05 to 0.3 μm as will be described later, it is understood that there is a case where the particle diameters of the inert fine particles are larger than the thickness(es) of the layer A and/or the layer B. In such a case where the particle diameters of the inert fine particles are larger than the thickness(es) of the layer A and/or the layer B, when the section, along the direction in which the layer A and the layer B are laminated, of the multilayer film of the present invention is observed, the inert fine particles are present across two or more the layers A and/or the layers B. In this case, if the particle diameters of the inert fine particles are excessively larger than the thickness(es) of the layer A and/or the layer B, the lamination form of the portions in the layers A and B where the excessively larger inert fine particles are present will be collapsed. Therefore, it is preferable that the thickness(es) of the layer A and/or the layer B satisfy the relationship represented by the following expression.

$$d/n < 5$$

In the above expression, d represents the average particle diameter of the inert fine particles, and n represents the thickness of one layer of the layers A or the layers B respectively.

Illustrative examples of such inert fine particles include inorganic inert particles such as silica, alumina, calcium carbonate, calcium phosphate, kaolin and talc; and organic inert particles such as silicone and crosslinked polystyrene. An example of the crosslinked polystyrene is a styrene-divinylbenzene copolymer. This inert fine particles are spherical particles, (which may be called real spherical particles below), having a ratio of the long diameter to the short diameter of preferably 1.2 or less, more preferably 1.1 or less. The above particle diameter ratio is preferable in view of keeping a balance between the slipperiness and optical properties of the film. Further, said inert fine particles preferably have sharp particle size distribution. For example, the relative standard deviation of the particle diameter is preferably smaller than 0.3, more preferably smaller than 0.2. The use of particles having a large relative standard deviation increases the frequency of occurrence of coarse particles, whereby optical defects are produced in some cases. The average particle diameter, particle diameter ratio and relative standard deviation of the inert fine particles are calculated by sputtering an extremely thin film of metal for imparting conductivity on the surfaces of the particles, determining the long diameter, short diameter and diameter equivalent to area circle of the particle by observing an image magnified by 10,000 to 30,000 times of the particles under an electron microscope and inserting these into the following expression.

average particle diameter=total sum of diameters equivalent to area circle of measured particles/number of the measured particles particle diameter ratio=average long diameter of particles/average short diameter of the particles It is preferable that the use of particles which act as pigments, such as titanium oxide and zinc sulfide, or colored particles as the above inert fine particles be avoided in as many chances as possible, because they degrade the optical properties.

The layers A and the layers B according to the present invention is in the state to which these layers are laminated alternately so that it may become 11 or more layers, preferably 31 or more layers in all. When the number of laminated layers is less than 11, the selective reflection by multiple interference is small, so that a sufficient reflectance cannot be obtained. An upper limit for the number of laminated layers is preferably 301 layers at most from the viewpoints of productivity and the like.

As for the multilayer film according to the present invention, it is preferably that each outermost layer consists of the layer A, and the layers A more preferably contain the inert fine particles in that case. When the layers A are the outermost layers, the thermally unstable layers B are located as the inner layer. Therefore, there is such an advantage that the multilayer film can be produced at required sufficient stretch temperature and heat-setting temperature. In addition, the layer A containing the inert fine particles improves the windability of the film sufficiently.

In the present invention, the thickness of each of the layer A and B is 0.05 to 0.3 μm. By setting the thickness to within the above range, light can be selectively reflected by the optical interference between the layers. When the thickness of one layer of the layers A or the layers B is measured, as for the variation in each thickness of the layer A or the layer B, it is desirable that it is 0.15 or less in terms of relative standard deviation. When this relative standard deviation exceeds 0.15, the interference in each layer becomes weak, thereby degrading the reflectance. The relative standard deviation of the thickness of the layer A (or layer B) is calculated by the following expression.

$$\text{relative standard deviation} = \sqrt{\frac{\sum_{i=1}^{n}(t_i - \bar{t})^2}{n}} \bigg/ \bar{t}$$

$t_i$: the thickness of one layer of the layers A (or the layers B) (μm)

$\bar{t}$: the average of thickness of one layer of the layers A (or the layers B)

n: the number of laminated layers of the layers A (or the layers B)

The multilayer film of the present invention is oriented at least in one direction and preferably biaxially oriented.

The multilayer film of the present invention can be produced, for example, in the following manner.

Firstly, a multilayer unstretched film is produced by a simultaneous multilayer extrusion method using a feed block. That is, the molten polymer forming the layer A such as polyethylene-2,6-naphthalene dicarboxylate containing the inert fine particles, and the molten polymer forming the layer B such as a mixture of polyethylene-2,6-naphthalene dicarboxylate and polyethylene terephthalate are laminated by using the feed block in such a manner that the two layers are laminated alternately and that the layers A are formed as the outermost layers; released in a die; and extruded. At this time, the polymers laminated by the feed block maintain the lamination form. The sheet extruded from the die is quenched and solidified by a casting drum to form into a multilayer unstretched film. This multilayer film in the state where it is not stretched, then is stretched at least in one direction and preferably biaxially to form into the multilayer film of the present invention. The stretching is preferably carried out at temperatures between the Tg and the Tg+50° C. of the polymer of the layer A. In the case of monoaxial stretching, the stretch ratio is preferably 2 to 10 times, and the stretch direction may be a longitudinal direction or a transverse direction. In the case of biaxial stretching, the stretch ratios in longitudinal and transverse directions are preferably at least 1.2 times, more preferably at least 1.5 times, and the area ratio is preferably 5 to 25 times. The larger the stretch ratios, the thicker the unstretched multilayer film can be made, and the larger the stretch ratios, the more variations in the thicknesses of the layers in the multilayer unstretched film can be reduced. As a result, the optical interference in each layer is expanded, thereby increasing the reflectance advantageously. In this respect, the area ratio is preferably at least 8 times, more preferably at least 10 times. As the stretch method, known stretch methods such as sequential biaxially stretching, simultaneous biaxial stretching, tubular stretching and inflation stretching can be used, and sequential biaxially stretching is preferable from the viewpoints of productivity and quality. Then, the stretched film is preferably heat-treated (heat-set) for thermal stabilization. The heat treatment temperature is preferably between (TmA−60)° C. and (TmA−10)° C., when the melting point (TmA) of the polymer of the layer A is a reference temperature.

The multilayer film of the present invention may have other layer(s) laminated on one surface or both surfaces thereof to the extent that the optical properties do not deteriorate, for the purpose of adjusting the thickness of the whole film or imparting other function(s) to the film. Illustrative examples of the above other layer include a transparent polyester film, an antireflection layer, a thin metal film and a hard coat layer.

The multilayer film of the present invention can be used as a semi-transparent film, a refractive polarizer film, a near-infrared ray refractive film, or a decorative film such as a lapping film.

Further, the multilayer film of the present invention can be used as the laminate to which the multilayer films of two or more are laminated to each other. In this case, the same multilayer films may be laminated, or the different multilayer films, for example, having a different refractive index, a different wavelength of visible light to be reflected or the like may be laminated. The laminate to which the multilayer films of two or more are laminated to each other can be used as the refractive polarizer film.

EXAMPLES

The present invention will be further described with reference to examples. The physical properties in the examples were measured in accordance with the following methods.

(1) Melting Point and Glass Transition Point (Tg) of Polyester 20 mg of polyester chips were sampled, and the melting point and glass transition point of the polyester were measured at a temperature elevating rate of 20° C./min by using the DSC (DSC2920) manufactured by TA Instrument Co., Ltd.

(2) Thickness of Each Layer

A sample was cut out in the form of a triangle, and after fixed in an embedding capsule, the sample was embedded by epoxy resin. Then, the embedded sample was sliced parallel to the longitudinal direction by microtome (ULTRACUT-S) to obtain a 50-nm-thick thin slice. The obtained slice was observed and photographed at an acceleration voltage of 100 kv by using a transmission electron microscope. The thickness of each layer was determined from the photograph, and the average thickness and the relative standard deviation were determined.

(3) Reflectance

The relative mirror reflectance to an aluminum-deposited mirror was measured for each wavelength in the range of 350 to 2,100 nm by using the spectrophotometer MPC-3100 of Shimadzu Corp. The wavelength at which the reflectance reaches the peak is taken as a peak wavelength, and the reflectance at the peak wavelength was measured.

(4) Transmission

The light transmittance was measured for each wavelength in the range of 350 to 2,100 nm by using the spectrophotometer MPC-3100 of Shimadzu Corp. as in the case of the measurement of the reflectance. The peak wavelength and transmission were measured.

(5) General Light Transmission

The light transmittance was measured for each wavelength in the visible light range (450 to 700 nm), and the average light transmittance in the above visible light range was taken as a general light transmittance.

(6) Windability

The formed film was ranked based on the following criteria at the time of winding up.
◎: Can be wound up without problems.
○: Can be wound up by decreasing the winding rate or adjusting the winding conditions.
Δ: Has debris and wrinkles, but still can be wound up.
X: Cannot be wound up due to serious debris and wrinkles even after the winding condition are adjusted.

(7) Film formability

The film at the time of film formation was observed and ranked based on the following criteria.
◎: No problems such as breakages at the time of film formation.
○: The film can be formed only under narrow limited conditions, but a roll of long length can be obtained.
Δ: Problems such as breakages exist at the time of continuous film formation, and a roll of long length is difficult to obtain.
X: Continuous film formability is poor, and the film formation is possible only within an extremely short period of time.

Example 1

Polyethylene-2,6-naphthalene dicarboxylate (PEN) having an intrinsic viscosity (orthochlorophenol, 35° C.) of 0.62 and polyethylene terephthalate (PET) having an intrinsic viscosity (orthochlorophenol, 35° C.) of 0.63 were provided. 0.11 wt % of real spherical silica particles (average particle diameter: 0.12 μm, ratio of long diameter to short diameter: 1.02, relative standard deviation of particle diameter: 0.1) were added to the PEN to prepare a resin for the layer A, and the PEN containing no inert fine particles and the PET were mixed together in a weight ratio of 50:50 to prepare a resin for the layer B. After the resin for the layer A was dried at 160° C. for 3 hours and the mixed resin for the layer B was dried at 160° C. for 3 hours, they were fed into an extruder and molten. After the polymer for the layer A was divided into 31 layers and the polymer for the layer B was divided into 30 layers, they were merged with each other by using a multilayer feed block device capable of laminating the layers A and the layers B alternately. Then, the layers A and the layers B were introduced to a die with the lamination form maintained, and cast on a casting drum to prepare a laminated unstretched sheet in which the layer A and the layer B were laminated alternately to a total of 61 layers. To prepare the laminated unstretched sheet, the ratio of the extruded polymer for the layer A to the extruded polymer for the layer B was adjusted to be 1:0.8, and the layers were laminated so that both outermost layers should be the layers A. This laminated unstretched sheet was stretched by 3.5 times in the longitudinal direction at a temperature of 150° C. and then by 5.5 times in the transverse direction at a stretch temperature of 155° C., and heat-treated at 230° C. for 3 seconds. The production conditions are shown in Table 1, and the physical properties of the obtained multilayer films are shown in Table 2.

Examples 2 to 14 and Comparative Examples 1 to 10

The procedures as used in Example 1 were repeated except that the production conditions were changed as shown in Table 1. The physical properties of the obtained multilayer films are shown in Table 2.

The inert fine particle in Example 3 was true spherical silicone (ratio of long diameter to short diameter: 1.1, relative standard deviation of particle diameter: 0.30); the inert fine particle in Example 4 was an aggregated calcium carbonate (ratio of long diameter to short diameter: 1.4, relative standard deviation of particle diameter: 0.25); the IA6-PEN in Examples 5 and 8 was a copolymer with an intrinsic viscosity (orthochlorophenol, 35° C.) of 0.63 in which 6 mol % of the total of all dicarboxylic acid components had been substituted by isophthalic acid; the TA5-PEN in Example 6 was a copolymer with an intrinsic viscosity (orthochlorophenol, 35° C.) of 0.62 in which 5 mol % of the total of all dicarboxylic acid components had been substituted by terephthalic acid; the IA10-PET in Example 7 was a copolymer with an intrinsic viscosity (orthochlorophenol, 35° C.) of 0.62 in which 10 mol % of the total of all dicarboxylic acid components had been substituted by isophthalic acid; and the PET used for the layer A of Comparative Example 6 was the same as the PET used for the layer B of Example 1.

TABLE 1

| | layer A | | | | | layer B | | | | |
|---|---|---|---|---|---|---|---|---|---|---|
| | resin | | inert fine particles | | | | mixed resin for layer B | | | |
| item | number of layers | layer for layer A | kind | particle diameter | amount added | number of layers | kind of rein | mixing ratio | kind of rein | mixing ratio |
| unit | — | — | — | μm | wt % | — | — | % | — | % |
| Ex. 1 | 31 | PEN | real spherical silica | 0.12 | 0.11 | 30 | PEN | 50 | PET | 50 |
| Ex. 2 | 31 | PEN | real spherical silicone | 0.2 | 0.15 | 30 | PEN | 50 | PET | 50 |
| Ex. 3 | 31 | PEN | aggregated calcium carbonate | 1.2 | 0.01 | 30 | PEN | 50 | PET | 50 |
| Ex. 4 | 121 | PEN | real spherical silica | 0.12 | 0.11 | 120 | PEN | 50 | PET | 50 |
| Ex. 5 | 31 | PEN | real spherical silica | 0.12 | 0.11 | 30 | IA6-PEN | 50 | PET | 50 |
| Ex. 6 | 31 | PEN | real spherical silica | 0.12 | 0.11 | 30 | TA5-PEN | 50 | PET | 50 |
| Ex. 7 | 31 | PEN | real spherical silica | 0.12 | 0.11 | 30 | PEN | 50 | IA10-PET | 50 |
| Ex. 8 | 31 | IA6-PEN | real spherical silica | 0.12 | 0.11 | 30 | PEN | 50 | PET | 50 |
| Ex. 9 | 31 | PEN | real spherical silica | 0.12 | 0.11 | 30 | PEN | 70 | PET | 30 |
| Ex. 10 | 31 | PEN | real spherical silica | 0.12 | 0.11 | 30 | PEN | 30 | PET | 70 |
| Ex. 11 | 31 | PEN | real spherical silica | 0.12 | 0.11 | 30 | PEN | 50 | PET | 50 |
| Ex. 12 | 31 | PEN | real spherical silica | 0.12 | 0.11 | 30 | PEN | 50 | PET | 50 |
| Ex. 13 | 31 | PEN | real spherical silica | 0.12 | 0.11 | 30 | PEN | 50 | PET | 50 |
| Ex. 14 | 31 | PEN | real spherical silica | 0.12 | 0.11 | 30 | PEN | 50 | PET | 50 |
| C. Ex. 1 | 31 | PEN | | | — | 30 | PEN | 50 | PET | 50 |
| C. Ex. 2 | 31 | PEN | real spherical silica | 0.008 | 0.2 | 30 | PEN | 50 | PET | 50 |
| C. Ex. 3 | 31 | PEN | real spherical silica | 3.5 | 0.1 | 30 | PEN | 50 | PET | 50 |
| C. Ex. 4 | 31 | PEN | real spherical silica | 0.12 | 0.0005 | 30 | PEN | 50 | PET | 50 |
| C. Ex. 5 | 31 | PEN | real spherical silica | 0.12 | 0.6 | 30 | PEN | 50 | PET | 50 |
| C. Ex. 6 | 31 | PET | real spherical silica | 0.12 | 0.11 | 30 | PEN | 50 | PET | 50 |
| C. Ex. 7 | 31 | PEN | real spherical silica | 0.12 | 0.11 | 30 | PEN | 100 | PET | 0 |
| C. Ex. 8 | 5 | PEN | real spherical silica | 0.12 | 0.11 | 4 | PEN | 50 | PET | 50 |
| C. Ex. 9 | 31 | PEN | real spherical silica | 0.12 | 0.11 | 30 | PEN | 50 | PET | 50 |
| C. Ex. 10 | 31 | PEN | real spherical silica | 0.12 | 0.11 | 30 | PEN | 50 | PET | 50 |

| | stretch conditions | | | | |
|---|---|---|---|---|---|
| | longitudinal stretching | | transverse stretching | | heat-setting |
| item | temperature | ratio | temperature | ratio | temperature |
| unit | ° C. | — | ° C. | — | ° C. |
| Ex. 1 | 150 | 3.5 | 155 | 5.5 | 230 |
| Ex. 2 | 150 | 3.5 | 155 | 5.5 | 230 |
| Ex. 3 | 150 | 3.5 | 155 | 5.5 | 230 |
| Ex. 4 | 150 | 3.5 | 155 | 5.5 | 230 |
| Ex. 5 | 150 | 3.5 | 155 | 5.5 | 230 |
| Ex. 6 | 150 | 3.5 | 155 | 5.5 | 230 |
| Ex. 7 | 150 | 3.5 | 155 | 5.5 | 230 |
| Ex. 8 | 150 | 3.5 | 155 | 5.5 | 220 |
| Ex. 9 | 150 | 3.5 | 155 | 5.5 | 230 |
| Ex. 10 | 150 | 3.5 | 155 | 5.5 | 230 |
| Ex. 11 | 150 | 3.5 | 155 | 5.5 | 230 |
| Ex. 12 | 150 | 3.5 | 155 | 5.5 | 230 |

TABLE 1-continued

|  | | | | | |
|---|---|---|---|---|---|
| Ex. 13 | 150 | 3.5 | 155 | 5.5 | 230 |
| Ex. 14 | — | — | 140 | 4.0 | 220 |
| C. Ex. 1 | 150 | 3.5 | 155 | 5.5 | 230 |
| C. Ex. 2 | 150 | 3.5 | 155 | 5.5 | 230 |
| C. Ex. 3 | 150 | 3.5 | 155 | 5.5 | 230 |
| C. Ex. 4 | 150 | 3.5 | 155 | 5.5 | 230 |
| C. Ex. 5 | 150 | 3.5 | 155 | 5.5 | 230 |
| C. Ex. 6 | 150 | 3.5 | 155 | 4.5 | 220 |
| C. Ex. 7 | 150 | 3.5 | 155 | 5.5 | 230 |
| C. Ex. 8 | 150 | 3.5 | 155 | 5.0 | 230 |
| C. Ex. 9 | 150 | 3.5 | 155 | 5.5 | 230 |
| C. Ex. 10 | 150 | 3.5 | 155 | 5.5 | 230 |

Ex.: Example
C. Ex.: Comparative Example

TABLE 2

| | layer A | | | layer B | | |
|---|---|---|---|---|---|---|
| item<br>unit | melting point<br>°C. | average thickness<br>μm | relative standard deviation of thickness<br>— | melting point at higher temperature side<br>°C. | average thickness<br>μm | relative standard deviation of thickness<br>— |
| Ex. 1 | 269 | 0.14 | 0.04 | 245 | 0.11 | 0.06 |
| Ex. 2 | 269 | 0.14 | 0.04 | 245 | 0.11 | 0.06 |
| Ex. 3 | 269 | 0.14 | 0.04 | 245 | 0.11 | 0.06 |
| Ex. 4 | 269 | 0.14 | 0.04 | 245 | 0.11 | 0.06 |
| Ex. 5 | 269 | 0.14 | 0.04 | 240 | 0.11 | 0.06 |
| Ex. 6 | 269 | 0.14 | 0.04 | 242 | 0.11 | 0.06 |
| Ex. 7 | 269 | 0.14 | 0.04 | 244 | 0.11 | 0.07 |
| Ex. 8 | 254 | 0.14 | 0.04 | 245 | 0.11 | 0.06 |
| Ex. 9 | 269 | 0.14 | 0.04 | 253 | 0.11 | 0.07 |
| Ex. 10 | 269 | 0.14 | 0.04 | 240 | 0.11 | 0.09 |
| Ex. 11 | 269 | 0.17 | 0.04 | 245 | 0.12 | 0.06 |
| Ex. 12 | 269 | 0.22 | 0.04 | 245 | 0.15 | 0.06 |
| Ex. 13 | 269 | 0.14 | 0.09 | 245 | 0.11 | 0.09 |
| Ex. 14 | 269 | 0.14 | 0.08 | 245 | 0.11 | 0.08 |
| C. Ex. 1 | 269 | 0.14 | 0.04 | 245 | 0.11 | 0.05 |
| C. Ex. 2 | 269 | 0.14 | 0.04 | 245 | 0.11 | 0.05 |
| C. Ex. 3 | 269 | 0.14 | 0.04 | 245 | 0.11 | 0.05 |
| C. Ex. 4 | 269 | 0.14 | 0.04 | 245 | 0.11 | 0.05 |
| C. Ex. 5 | 269 | 0.14 | 0.04 | 245 | 0.11 | 0.05 |
| C. Ex. 6 | 258 | 0.14 | 0.04 | 245 | 0.11 | 0.05 |
| C. Ex. 7 | 269 | 0.14 | 0.04 | 269 | 0.11 | 0.05 |
| C. Ex. 8 | 269 | 0.14 | 0.04 | 245 | 0.11 | 0.05 |
| C. Ex. 9 | 269 | 0.35 | 0.04 | 245 | 0.35 | 0.16 |
| C. Ex. 10 | 269 | 0.03 | 0.03 | 245 | 0.03 | 0.03 |

| | reflectance | | transmittance | | | | |
|---|---|---|---|---|---|---|---|
| item<br>unit | peak wavelength<br>nm | reflectance<br>% | peak wavelength<br>nm | transmittance<br>% | general light transmittance<br>% | windability<br>— | film formability<br>— |
| Ex. 1 | 590 | 52 | 590 | 48 | 81 | ⊚ | ⊚ |
| Ex. 2 | 590 | 50 | 590 | 45 | 80 | ⊚ | ⊚ |
| Ex. 3 | 590 | 51 | 590 | 45 | 80 | ⊚ | ⊚ |
| Ex. 4 | 590 | 55 | 590 | 40 | 75 | ⊚ | ⊚ |
| Ex. 5 | 590 | 51 | 590 | 49 | 81 | ⊚ | ⊚ |
| Ex. 6 | 590 | 51 | 590 | 49 | 81 | ⊚ | ⊚ |
| Ex. 7 | 590 | 53 | 590 | 49 | 81 | ⊚ | ⊚ |
| Ex. 8 | 590 | 50 | 590 | 49 | 79 | ⊚ | ⊚ |
| Ex. 9 | 590 | 31 | 590 | 65 | 80 | ⊚ | ⊚ |
| Ex. 10 | 590 | 75 | 590 | 25 | 80 | ⊚ | ⊚ |
| Ex. 11 | 750 | 53 | 750 | 49 | 79 | ⊚ | ⊚ |
| Ex. 12 | 910 | 52 | 910 | 48 | 77 | ⊚ | ⊚ |
| Ex. 13 | 590 | 40 | 590 | 55 | 81 | ⊚ | ⊚ |
| Ex. 14 | 590 | 48 | 590 | 52 | 80 | ⊚ | ○ |
| C. Ex. 1 | 590 | 55 | 590 | 54 | 87 | x | Δ |
| C. Ex. 2 | 590 | 53 | 590 | 53 | 86 | x | ○ |
| C. Ex. 3 | 590 | 40 | 590 | 40 | 60 | ⊚ | ⊚ |
| C. Ex. 4 | 590 | 55 | 590 | 52 | 85 | x | ○ |
| C. Ex. 5 | 590 | 43 | 590 | 43 | 63 | ⊚ | ⊚ |
| C. Ex. 6 | — | — | — | — | — | ⊚ | x |
| C. Ex. 7 | none | — | none | — | 81 | ⊚ | ⊚ |
| C. Ex. 8 | 590 | 5 | 590 | 78 | 87 | Δ | x |

TABLE 2-continued

| C. Ex. 9  | none | — | none | — | 75 | ◎ | ◎ |
| C. Ex. 10 | none | — | none | — | 86 | Δ | x |

Ex.: Example
C. Ex.: Comparative Example

Tables 1 and 2 will be examined hereinafter.

The multilayer films of Examples 1 to 14 of the present invention exhibited excellent windability and film formability while having a general light transmittance of not lower than 70% and a sharp reflection peak for light of particular wavelengths (590, 750 and 910 nm). Although the film formability of the multilayer film of Example 14 is slightly inferior to those of Examples 1 to 13 due to the difference in film formability between the biaxially oriented films and the monoaxially oriented film, the film formability has been improved by the inert particles when the film formabilities are compared with each other under monoaxial stretching conditions.

Comparative Examples 1, 2 and 3 could not be wound up due to the poor slipperiness of the multilayer films which was ascribable to the fact that Comparative Example 1 contained no inert particles, Comparative Example 2 contained inert particles having a small particle diameter and Comparative Example 3 contained a small amount of inert particles as compared with the present invention. Comparative Example 3 and 5 had a poor general light transmittance of lower than 70% because Comparative Example 3 contained inert particles having a large particle diameter and Comparative Example 5 contained a large amount of inert particles as compared with the present invention, and were therefore of little practical use for optical applications. As for Comparative Example 6, many breakages occurred at the time of film formation because the layer A was polyethylene terephthalate and therefore a film was barely formed. Comparative Examples 7 or 9 had no sharp reflection peaks for light of particular wavelength because the layers B and the layers A were the same or the thickness of each layer was too large as compared with the present invention. Comparative Example 9 had not only no sharp reflection peak for light of particular wavelength but also poor film formability and windability because the thickness of each layer was too small as compared with the present invention. Although Comparative Example 8 had a reflection peak for light of particular wavelength because the number of laminated layers was small as compared with the present invention, its reflectance was only 5% and the thickness of the whole multilayer film was also small, and it therefore had poor film formability and windability.

Example 15

There was prepared, as the resin for the layer A, a polyethylene-2,6-naphthalene dicarboxylate (PEN) having an intrinsic viscosity (orthochlorophenol, 35° C.) of 0.62 to which 0.08 wt % of real spherical silica particles having an average particle diameter of 0.15 μm, a ratio of the long diameter to the short diameter of 1.04 and a relative standard deviation of the particle diameter of 0.13 had been added. Further, there was also prepared, as the resin for the layer B, syndiotactic polystyrene copolymerized with 8 mol % of p-methylstyrene containing no inert particles. The polymer for the layer A had a melting point (Tm) of 269° C. and a glass transition point (Tg) of 121° C., and the polymer for the layer B had a melting point (Tm) of 250° C. and a glass transition point (Tg) of 100° C. After the polymer for the layer A was dried at 160° C. for 3 hours and the polymer for the layer B was dried at 100° C. for 3 hours, they were fed into an extruder and molten. After the polymer for the layer A was divided into 25 layers and the polymer for the layer B was divided into 24 layers, they were merged with each other by using a multilayer feed block device capable of laminating the layer A and the layer B alternately. Then, the layers A and the layers B were introduced to a die with their lamination form maintained, and cast on a casting drum to prepare a laminated unstretched sheet in which the layer A and the layer B were laminated alternately to a total of 49 layers. To prepare the laminated unstretched sheet, the ratio of the extruded polymer for the layer A to the extruded polymer for the layer B was set to be 1:0.7, and the layers were laminated in such a manner that both surface layers should be the layers A. The above laminated unstretched sheet was stretched by 3.5 times in the longitudinal direction at a temperature of 150° C. and then by 5.5 times in the transverse direction at a stretch temperature of 155° C., and heat-set at 220° C. for 3 seconds. The production conditions and physical properties of the film are shown in Tables 3 to 5.

Examples 16 to 25 and Comparative Examples 11 to 19 and Reference Example 1

The production conditions were varied as shown in Tables 3 and 4 to prepare films in the same manner as in Example 15. However, as far as Example 25 is concerned, no longitudinal stretching, but only transverse stretching was carried out. The properties of the films are shown in Table 5.

TABLE 3

| | | | | layer A | | | | |
| | | | | resin for layer A | | | | |
| item unit | number of layers — | resin layer — | melting point °C. | inert fine particles — | particle diameter μm | amount added wt % | average thickness of layer A μm | relative standard deviation of thickness — |
|---|---|---|---|---|---|---|---|---|
| Ex. 15 | 25 | PEN | 269 | real spherical silica | 0.15 | 0.08 | 0.14 | 0.06 |
| Ex. 16 | 25 | PEN | 269 | real spherical silicone | 0.1 | 0.2 | 0.14 | 0.06 |
| Ex. 17 | 25 | PEN | 269 | aggregated calcium carbonate | 1.5 | 0.01 | 0.14 | 0.06 |
| Ex. 18 | 101 | PEN | 269 | real spherical silica | 0.15 | 0.08 | 0.14 | 0.06 |
| Ex. 19 | 25 | PEN | 269 | real spherical silica | 0.15 | 0.08 | 0.14 | 0.06 |

TABLE 3-continued

| | | | layer A | | | | | |
|---|---|---|---|---|---|---|---|---|
| | | | | resin for layer A | | | | |
| item | number of layers | resin layer | melting point | inert fine particles | particle diameter | amount added | average thickness of layer A | relative standard deviation of thickness |
| unit | — | — | °C. | — | μm | wt % | μm | — |
| Ex. 20 | 25 | PEN | 269 | real spherical silica | 0.15 | 0.08 | 0.14 | 0.06 |
| Ex. 21 | 25 | IA6-PEN | 250 | real spherical silica | 0.15 | 0.08 | 0.14 | 0.06 |
| Ex. 22 | 25 | PEN | 269 | real spherical silica | 0.15 | 0.08 | 0.17 | 0.06 |
| Ex. 23 | 25 | PEN | 269 | real spherical silica | 0.15 | 0.08 | 0.22 | 0.06 |
| Ex. 24 | 25 | PEN | 269 | real spherical silica | 0.15 | 0.08 | 0.14 | 0.09 |
| Ex. 25 | 25 | PEN | 269 | real spherical silica | 0.15 | 0.08 | 0.14 | 0.08 |
| C. Ex. 11 | 25 | PEN | 269 | — | — | — | 0.14 | 0.06 |
| C. Ex. 12 | 25 | PEN | 269 | real spherical silica | 0.005 | 0.3 | 0.14 | 0.06 |
| C. Ex. 13 | 25 | PEN | 269 | real spherical silica | 3 | 0.1 | 0.14 | 0.06 |
| C. Ex. 14 | 25 | PEN | 269 | real spherical silica | 0.2 | 0.0005 | 0.14 | 0.06 |
| C. Ex. 15 | 25 | PEN | 269 | real spherical silica | 0.2 | 0.6 | 0.14 | 0.06 |
| C. Ex. 16 | 25 | PET | 258 | real spherical silica | 0.2 | 0.08 | 0.14 | 0.06 |
| C. Ex. 17 | 5 | PEN | 269 | real spherical silica | 0.2 | 0.08 | 0.14 | 0.06 |
| C. Ex. 18 | 25 | PEN | 269 | real spherical silica | 0.2 | 0.08 | 0.35 | 0.06 |
| C. Ex. 19 | 25 | PEN | 269 | real spherical silica | 0.2 | 0.08 | 0.03 | 0.03 |
| R. Ex. 1 | 25 | PEN | 269 | real spherical silica | 0.2 | 0.08 | 0.14 | 0.18 |

Ex.: Example,
C. Ex.: Comparative Example,
R. Ex.: Reference Example
PEN: polyethylene-2,6-naphthalate
IA6-PEN: polyethylene-2,6-naphthalate copolymerized with 6 mol % of isophthalic acid
PET: polyethylene terephthalate

TABLE 4

| | | layer B | | | difference in |
|---|---|---|---|---|---|
| | number | resin for layer B | thickness | relative standard | Tm between |
| item | of layers | resin layer | melting point | of layer B | deviation of thickness | layer A and layer B |
| unit | — | — | °C. | μm | — | °C. |
| Ex.15 | 24 | PMS8-SPS | 250 | 0.10 | 0.05 | 19 |
| Ex.16 | 24 | PMS8-SPS | 250 | 0.10 | 0.05 | 19 |
| Ex.17 | 24 | PMS8-SPS | 250 | 0.10 | 0.05 | 19 |
| Ex.18 | 100 | PMS8-SPS | 250 | 0.10 | 0.05 | 19 |
| Ex.19 | 24 | SPS | 270 | 0.10 | 0.05 | −1 |
| Ex.20 | 24 | PMS10-SPS | 245 | 0.10 | 0.05 | 24 |
| Ex.21 | 24 | PMS15-SPS | 233 | 0.10 | 0.05 | 17 |
| Ex.22 | 24 | PMS8-SPS | 250 | 0.12 | 0.05 | 19 |
| Ex.23 | 24 | PMS8-SPS | 250 | 0.15 | 0.05 | 19 |
| Ex.24 | 24 | PMS8-SPS | 250 | 0.10 | 0.09 | 19 |
| Ex.25 | 24 | PMS8-SPS | 250 | 0.10 | 0.08 | 19 |
| C.Ex.11 | 24 | PMS8-SPS | 250 | 0.10 | 0.05 | 19 |
| C.Ex.12 | 24 | PMS8-SPS | 250 | 0.10 | 0.05 | 19 |
| C.Ex.13 | 24 | PMS8-SPS | 250 | 0.10 | 0.05 | 19 |
| C.Ex.14 | 24 | PMS8-SPS | 250 | 0.10 | 0.05 | 19 |
| C.Ex.15 | 24 | PMS8-SPS | 250 | 0.10 | 0.05 | 19 |
| C.Ex.16 | 24 | PMS8-SPS | 250 | 0.10 | 0.05 | 8 |
| C.Ex.17 | 4 | PMS8-SPS | 250 | 0.10 | 0.05 | 19 |
| C.Ex.18 | 24 | PMS8-SPS | 250 | 0.35 | 0.05 | 19 |
| C.Ex.19 | 24 | PMS8-SPS | 250 | 0.03 | 0.03 | 19 |
| R.Ex.1 | 24 | PMS8-SPS | 250 | 0.10 | 0.20 | 19 |

| | stretch conditions | | | | | |
|---|---|---|---|---|---|---|
| | longitudinal stretching | | transverse stretching | | heat-setting | thickness of |
| item | temperature | ratio | temperature | ratio | temperature | whole film |
| unit | °C. | — | °C. | — | °C | μm |
| Ex.15 | 150 | 3.5 | 155 | 5.5 | 220 | 6 |
| Ex.16 | 150 | 3.5 | 155 | 5.5 | 220 | 6 |
| Ex.17 | 150 | 3.5 | 155 | 5.5 | 220 | 6 |
| Ex.18 | 150 | 3.5 | 155 | 5.5 | 220 | 24 |
| Ex.19 | 150 | 3.5 | 155 | 5.5 | 220 | 6 |
| Ex.20 | 150 | 3.5 | 155 | 5.5 | 220 | 6 |

TABLE 4-continued

| | | | | | | |
|---|---|---|---|---|---|---|
| Ex.21 | 150 | 3.5 | 155 | 5.5 | 210 | 6 |
| Ex.22 | 150 | 3.5 | 155 | 5.5 | 220 | 7 |
| Ex.23 | 150 | 3.5 | 155 | 5.5 | 220 | 9 |
| Ex.24 | 150 | 3.5 | 155 | 5.5 | 220 | 6 |
| Ex.25 | — | — | 140 | 4 | 220 | 6 |
| C.Ex.11 | 150 | 3.5 | 155 | 5.5 | 220 | 6 |
| C.Ex.12 | 150 | 3.5 | 155 | 5.5 | 220 | 6 |
| C.Ex.13 | 150 | 3.5 | 155 | 5.5 | 220 | 6 |
| C.Ex.14 | 150 | 3.5 | 155 | 5.5 | 220 | 6 |
| C.Ex.15 | 150 | 3.5 | 155 | 5.5 | 220 | 6 |
| C.Ex.16 | 110 | 3.5 | 120 | 4.5 | 220 | 6 |
| C.Ex.17 | 150 | 3.5 | 155 | 5.7 | 210 | 1.1 |
| C.Ex.18 | 150 | 3.5 | 155 | 5.7 | 210 | 17 |
| C.Ex.19 | 150 | 3.5 | 155 | 5.7 | 210 | 1.5 |
| R.Ex.1 | 150 | 3.5 | 155 | 5.7 | 210 | 6 |

Ex.: Example,
C.Ex.: Comparative Example,
R.Ex.: Reference Example
SPS: syndiotactic polystyrene
PM8-SPS: syndiotactic polystyrene copolymerized with 8 mol % of p-methyl styrene
PM10-SPS: syndiotactic polystyrene copolymerized with 10 mol % of p-methyl styrene
PM15-SPS: syndiotactic polystyrene copolymerized with 15 mol % of p-methyl styrene
APS: atactic polystyrene
PET: polyethylene terephthalate
IPS: isotactic polystyrene

TABLE 5

| | reflectance | | transmittance | | | | | |
|---|---|---|---|---|---|---|---|---|
| item<br>unit | peak<br>wavelength<br>nm | reflectance<br>% | peak<br>wavelength<br>nm | transmittance<br>% | general light<br>transmittance<br>% | windability | film<br>formability | remark |
| Ex. 15 | 575 | 96 | 575 | 25 | 80 | ◎ | ◎ | |
| Ex. 16 | 575 | 96 | 575 | 23 | 81 | ◎ | ◎ | |
| Ex. 17 | 575 | 96 | 575 | 22 | 78 | ◎ | ◎ | |
| Ex. 18 | 575 | 99 | 575 | 8 | 76 | ◎ | ◎ | |
| Ex. 19 | 575 | 96 | 575 | 24 | 80 | ◎ | ○ | |
| Ex. 20 | 575 | 96 | 575 | 24 | 82 | ◎ | ◎ | |
| Ex. 21 | 575 | 96 | 575 | 23 | 80 | ◎ | ◎ | |
| Ex. 22 | 740 | 93 | 740 | 23 | 81 | ◎ | ◎ | |
| Ex. 23 | 900 | 96 | 900 | 20 | 83 | ◎ | ◎ | |
| Ex. 24 | 575 | 95 | 575 | 25 | 81 | ◎ | ◎ | |
| Ex. 25 | 575 | 97 | 575 | 23 | 80 | ◎ | ○ | |
| C. Ex. 11 | 575 | 99 | 575 | 24 | 86 | x | Δ | unable to be wound up due to poor slipperiness |
| C. Ex. 12 | 575 | 99 | 575 | 24 | 85 | x | ○ | unable to be wound up due to poor slipperiness |
| C. Ex. 13 | 575 | 80 | 575 | 23 | 64 | ◎ | ◎ | |
| C. Ex. 14 | 575 | 99 | 575 | 22 | 85 | x | ○ | unable to be wound up due to poor slipperiness |
| C. Ex. 15 | 575 | 85 | 575 | 22 | 65 | ◎ | ◎ | |
| C. Ex. 16 | no peak | — | no peak | — | 80 | ◎ | ◎ | |
| C. Ex. 17 | 575 | 40 | 575 | 60 | 82 | Δ | x | Film is thin and has many breakages |
| C. Ex. 18 | no peak | — | no peak | — | 81 | ◎ | ◎ | |
| C. Ex. 19 | no peak | — | no peak | — | 81 | Δ | x | Film is thin and difficult to form |
| R. Ex. 1 | 575 | 45 | 575 | 75 | 82 | ◎ | ◎ | |

Ex.: Example,
C. Ex.: Comparative Example,
R. Ex.: Reference Example

Example 26

There was prepared, as the resin for the layer A, a polyethylene-2,6-naphthalene dicarboxylate (PEN) having an intrinsic viscosity (orthochlorophenol, 35° C.) of 0.62 to which 0.1 wt % of real spherical silica particles having an average particle diameter of 0.2 μm, a ratio of the long diameter to the short diameter of 1.05 and a relative standard deviation of the particle diameter of 0.15 had been added. Further, there was also prepared, as the resin for the layer B, a copolyethylene terephthalate (IA12) having an intrinsic viscosity (orthochlorophenol, 35° C.) of 0.65 and copolymerized with 12 mol % of isophthalic acid containing no inert particles. The polyester for the layer A had a glass transition point (Tg) of 121° C., and the polyester for the layer B had a glass transition point (Tg) of 74° C.

After these polyesters were dried at 160° C. for 3 hours, they are fed into an extruder and molten. After the polymer for the layer A was divided into 25 layers and the polymer for the layer B was divided into 24 layers, they were merged with each other by using a multilayer feed block device capable of laminating the layer A and the layer B alternately.

Then, the layers A and the layers B were introduced to a die with their lamination form maintained, and cast on a casting drum to prepare a laminated unstretched sheet in which the layer A and the layer B were laminated alternately to a total of 49 layers. To prepare the laminated unstretched sheet, the ratio of the extruded polymer for the layer A to the extruded polymer for the layer B was set to be 1:0.7, and the layers were laminated such that both surface layers should be the layers A.

The above laminated unstretched sheet was stretched by 3.6 times in the longitudinal direction at a temperature of 140° C. and then by 5.7 times in the transverse direction at a stretch temperature of 150° C., and heat-treated at 210° C. for 3 seconds.

The production conditions and physical properties of the film are shown in Tables 6 and 7.

Examples 27 to 37 and Comparative Examples 20 to 24

The production conditions were varied as shown in Table 6 to prepare the films of Examples 27 to 37 and Comparative Examples 20 to 24 in the same manner as in Example 26. The properties of the films are shown in Table 7.

TABLE 6

| | | layer A | | | | | | | |
|---|---|---|---|---|---|---|---|---|---|
| | | resin for layer A | | | | | | | |
| item unit | number of layers — | resin layer — | melting point ° C. | Tg ° C. | inert fine particles — | particle diameter μm | amount added wt % | average thickness of layer A — | relative standard deviation of thickness — |
| Ex. 26 | 25 | PEN | 269 | 121 | real spherical silica | 0.2 | 0.1 | 0.13 | 0.05 |
| Ex. 27 | 25 | PEN | 269 | 121 | real spherical silicone | 0.1 | 0.2 | 0.13 | 0.05 |
| Ex. 28 | 25 | PEN | 269 | 121 | aggregated calcium carbonate | 1.5 | 0.01 | 0.13 | 0.05 |
| Ex. 29 | 101 | PEN | 269 | 121 | real spherical silica | 0.2 | 0.1 | 0.13 | 0.05 |
| Ex. 30 | 25 | PEN | 269 | 121 | real spherical silica | 0.2 | 0.1 | 0.13 | 0.05 |
| Ex. 31 | 25 | PEN | 269 | 121 | real spherical silica | 0.2 | 0.1 | 0.13 | 0.05 |
| Ex. 32 | 25 | IA6-PEN | 250 | 119 | real spherical silica | 0.2 | 0.1 | 0.13 | 0.05 |
| Ex. 33 | 25 | PEN | 269 | 121 | real spherical silica | 0.2 | 0.1 | 0.16 | 0.05 |
| Ex. 34 | 25 | PEN | 269 | 121 | real spherical silica | 0.2 | 0.1 | 0.21 | 0.05 |
| Ex. 35 | 25 | PEN | 269 | 121 | real spherical silica | 0.2 | 0.1 | 0.13 | 0.05 |
| Ex. 36 | 25 | PEN | 269 | 121 | real spherical silica | 0.2 | 0.1 | 0.13 | 0.09 |
| Ex. 37 | 25 | PEN | 269 | 121 | real spherical silica | 0.2 | 0.1 | 0.13 | 0.05 |
| C. Ex. 20 | 25 | PEN | 269 | 121 | — | — | — | 0.13 | 0.05 |
| C. Ex. 21 | 25 | PET | 269 | 121 | real spherical silica | 3 | 0.1 | 0.13 | 0.05 |
| C. Ex. 22 | 25 | PEN | 269 | 121 | real spherical silica | 0.2 | 0.0005 | 0.13 | 0.05 |
| C. Ex. 23 | 25 | PEN | 269 | 121 | real spherical silica | 0.2 | 0.6 | 0.13 | 0.05 |
| C. Ex. 24 | 25 | PET | 258 | 78 | real spherical silica | 0.2 | 0.1 | 0.13 | 0.05 |

| | | layer B | | | | | |
|---|---|---|---|---|---|---|---|
| | | resin for layer B | | | | | |
| item unit | number of layers — | resin layer — | melting point ° C. | Tg ° C. | thickness of layer B μm | relative standard deviation of thickness — | difference in Tm between layer A and layer B ° C. |
| Ex. 26 | 24 | IA12-PET | 223 | 74 | 0.09 | 0.05 | 47 |
| Ex. 27 | 24 | IA12-PET | 223 | 74 | 0.09 | 0.05 | 47 |
| Ex. 28 | 24 | IA12-PET | 223 | 74 | 0.09 | 0.05 | 47 |
| Ex. 29 | 100 | IA12-PET | 223 | 74 | 0.09 | 0.05 | 47 |
| Ex. 30 | 24 | IA8-PET | 234 | 75 | 0.09 | 0.05 | 46 |
| Ex. 31 | 24 | IA15-PET | 217 | 73 | 0.09 | 0.05 | 48 |
| Ex. 32 | 24 | IA12-PET | 223 | 74 | 0.09 | 0.05 | 42 |
| Ex. 33 | 24 | IA12-PET | 223 | 74 | 0.11 | 0.05 | 47 |
| Ex. 34 | 24 | IA12-PET | 223 | 74 | 0.14 | 0.05 | 47 |
| Ex. 35 | 24 | IA12-PET | 223 | 74 | 0.09 | 0.05 | 47 |
| Ex. 36 | 24 | IA12-PET | 223 | 74 | 0.09 | 0.09 | 47 |
| Ex. 37 | 24 | SA12-PET | 223 | 72 | 0.09 | 0.05 | 49 |
| C. Ex. 20 | 24 | IA12-PET | 223 | 74 | 0.09 | 0.05 | 47 |
| C. Ex. 21 | 24 | IA12-PET | 223 | 74 | 0.09 | 0.05 | 47 |
| C. Ex. 22 | 24 | IA12-PET | 223 | 74 | 0.09 | 0.05 | 47 |
| C. Ex. 23 | 24 | IA12-PET | 223 | 74 | 0.09 | 0.05 | 47 |
| C. Ex. 24 | 24 | IA12-PET | 223 | 74 | 0.09 | 0.05 | 4 |

| | stretch conditions | | | | | |
|---|---|---|---|---|---|---|
| | longitudinal stretching | | transverse stretching | | heat-setting | thickness of |
| item unit | temperature ° C. | ratio — | temperature ° C. | ratio — | temperature ° C. | whole film μm |
| Ex. 26 | 140 | 3.6 | 150 | 5.7 | 210 | 5 |
| Ex. 27 | 140 | 3.6 | 150 | 5.7 | 210 | 5 |
| Ex. 28 | 140 | 3.6 | 150 | 5.7 | 210 | 5 |
| Ex. 29 | 140 | 3.6 | 150 | 5.7 | 210 | 20 |

TABLE 6-continued

|        | | | | | | |
|---|---|---|---|---|---|---|
| Ex. 30  | 140 | 3.6 | 150 | 5.7 | 210 | 5 |
| Ex. 31  | 140 | 3.6 | 150 | 5.7 | 210 | 5 |
| Ex. 32  | 140 | 3.6 | 150 | 5.7 | 210 | 5 |
| Ex. 33  | 140 | 3.6 | 150 | 5.7 | 210 | 6 |
| Ex. 34  | 140 | 3.6 | 150 | 5.7 | 210 | 8 |
| Ex. 35  | 140 | 3.6 | 150 | 5.7 | 230 | 5 |
| Ex. 36  | 140 | 3.6 | 150 | 5.7 | 210 | 5 |
| Ex. 37  | 140 | 3.6 | 150 | 5.7 | 210 | 5 |
| C. Ex. 20 | 140 | 3.6 | 150 | 5.7 | 210 | 5 |
| C. Ex. 21 | 140 | 3.6 | 150 | 5.7 | 210 | 5 |
| C. Ex. 22 | 140 | 3.6 | 150 | 5.7 | 210 | 5 |
| C. Ex. 23 | 140 | 3.6 | 150 | 5.7 | 210 | 5 |
| C. Ex. 24 | 100 | 3.6 | 110 | 4.5 | 210 | 5 |

Ex.: Example,
C. Ex.: Comparative Example (in table 6)

PEN: polyethylene-2,6-naphthalate

PET: polyethylene terephthalate

IA6-PEN: polyethylene-2,6-naphthalate copolymerized with 6 mol % of isophthalic acid NDC15-PET: polyethylene terephthalate copolymerized with 15 mol % of naphthalene dicarboxylic acid SA12-PET: polyethylene terephthalate copolymerized with 12 mol % of sebacic acid PET: polyethylene terephthalate IA20-PET: polyethylene terephthalate copolymerized with 20 mol % of isophthalic acid IA3-PET: polyethylene terephthalate copolymerized with 3 mol % of isophthalic acid

TABLE 7

| | reflectance | | transmittance | | | | | |
|---|---|---|---|---|---|---|---|---|
| item<br>unit | peak<br>wavelength<br>nm | reflectance<br>% | peak<br>wavelength<br>nm | transmittance<br>% | general light<br>transmittance<br>% | windability | film<br>formability | remark |
| Ex. 26 | 560 | 97 | 560 | 22 | 80 | ◉ | ◉ | |
| Ex. 27 | 560 | 97 | 560 | 21 | 81 | ◉ | ◉ | |
| Ex. 28 | 560 | 97 | 560 | 20 | 78 | ◉ | ◉ | |
| Ex. 29 | 560 | 99 | 560 | 5 | 76 | ◉ | ◉ | |
| Ex. 30 | 560 | 96 | 560 | 24 | 77 | ◉ | ◉ | |
| Ex. 31 | 560 | 98 | 560 | 16 | 82 | ◉ | ◉ | |
| Ex. 32 | 560 | 96 | 560 | 22 | 80 | ◉ | ◉ | |
| Ex. 33 | 720 | 93 | 720 | 19 | 81 | ◉ | ◉ | |
| Ex. 34 | 880 | 96 | 880 | 15 | 83 | ◉ | ◉ | |
| Ex. 35 | 560 | 98 | 560 | 15 | 80 | ◉ | ◉ | |
| Ex. 36 | 560 | 95 | 560 | 25 | 81 | ◉ | ◉ | |
| Ex. 37 | 560 | 97 | 560 | 23 | 80 | ◉ | ◉ | |
| C. Ex. 20 | 560 | 99 | 560 | 22 | 86 | x | Δ | unable to be wound up due to poor slipperiness |
| C. Ex. 21 | 560 | 80 | 560 | 20 | 68 | ◉ | ◉ | |
| C. Ex. 22 | 560 | 99 | 560 | 23 | 85 | x | ○ | unable to be wound up due to poor slipperiness |
| C. Ex. 23 | 560 | 85 | 560 | 20 | 68 | ◉ | ◉ | |
| C. Ex. 24 | no peak | — | no peak | — | 80 | ◉ | ◉ | |

Ex.: Example,
C. Ex.: Comparative Example

IA18-PEN: polyethylene-2,6-naphthalate copolymerized with 18 mol % of isophthalic acid IA12-PET: polyethylene terephthalate copolymerized with 12 mol % of isophthalic acid IA8-PET: polyethylene terephthalate copolymerized with 8 mol % of isophthalic acid IA15-PET: polyethylene terephthalate copolymerized with 12 mol % of isophthalic acid

What is claimed is:

1. A multilayer film comprising a first layer comprising mainly a polyester whose main recurring unit is ethylene-2,6-naphthalene dicarboxylate and a second layer comprising mainly a thermoplastic resin which is different from the polyester of the first layer, wherein at least one of the first and second layers contains 0.001 to 0.5 wt % of inert fine particles selected from the group consisting of (a) inert fine particles having an average particle diameter of 0.1 to 0.2 µm and (b) a combination of inert fine particles having an average particle diameter of 0.1 to 0.2 µm and inert fine particles having an average particle diameter of 0.32 to 1 µm; the first and second layers each have a thickness of 0.05 to 0.3 µm and are laminated alternately to form a laminate comprising at least 11 layers; the laminate is oriented at least in one direction; and the second layer has a lower refractive index than the first layer at least in one direction.

2. The multilayer film of claim 1, wherein both outermost layers are the first layers.

3. The multilayer film of claim 1, wherein the polyester of the first layer is an ethylene-2,6-naphthalene dicarboxylate homopolymer.

4. The multilayer film of claim 1, wherein the thermoplastic resin of the second layer is a mixture of a polyester whose main recurring unit is ethylene-2,6-naphthalene dicarboxylate and a polyester whose main recurring unit is ethylene terephthalate in the weight ratio of 5:95 to 95:5.

5. The multilayer film of claim 4, wherein the second layer mixture has two melting points, and the higher melting point is in the range of 220° C. to 265° C. and is at least 10° C. lower than the melting point of the polyester of the first layer.

6. The multilayer film of claim 1, wherein the thermoplastic resin of the second layer is a syndiotactic polystyrene.

7. The multilayer film of claim 6, wherein the syndiotactic polystyrene is a syndiotactic poly(styrene-p-methylstyrene) copolymer.

8. The multilayer film of claim 6, wherein the melting point of the syndiotactic polystyrene is in the range of 220° C. to 270° C.

9. The multilayer film of claim 6, wherein the melting point of the syndiotactic polystyrene is between the melting point of the polyester of the first layer +30° C. and the melting point of the polyester of the first layer −30° C.

10. The multilayer film of claim 1, wherein the thermoplastic resin of the second layer is a polyester whose main recurring unit is ethylene terephthalate.

11. The multilayer film of claim 10, wherein the polyester of the second layer is a poly(ethylene terephthalate-isophthalate) copolymer.

12. The multilayer film of claim 10, wherein the melting point of the polyester of the second layer is in the range of 210° C. to 245° C.

13. The multilayer film of claim 10, wherein the melting point of the polyester of the second layer is at least 20° C. lower than the melting point of the polyester of the first layer.

14. The multilayer film of claim 1, wherein the inert fine particles are at least one member selected from the group consisting of silica, alumina, calcium carbonate, calcium phosphate, kaolin, talc, silicone and crosslinked polystyrene.

15. The multilayer film of claim 1, wherein the ratio of the long diameter to the short diameter of the inert fine particle is 1.2 or less.

16. The multilayer film of claim 1, wherein the relative standard deviation of the particle diameter of the inert fine particle is smaller than 0.3.

17. The multilayer film of claim 1, wherein the relative standard deviation of the thickness of the first layer and the relative standard deviation of the thickness of the second layer are each 0.15 or less.

18. The multilayer film of claim 1, wherein the total number of laminated layers is at least 31.

19. The multilayer film of claim 1, which is biaxially oriented.

20. A refractive polarizer film comprising a laminate of plural multilayer films of claim 1.

21. The polarizer film of claim 20, wherein each of the plural multilayer films reflects visible light having a different wavelength.

22. A semi-transparent film comprising the multilayer film of claim 1.

* * * * *